Nov. 14, 1944.  B. F. McGOVERN  2,362,653
METHOD AND APPARATUS FOR TREATING RUBBER
ARTICLES PRIOR TO VULCANIZATION
Filed Oct. 29, 1942
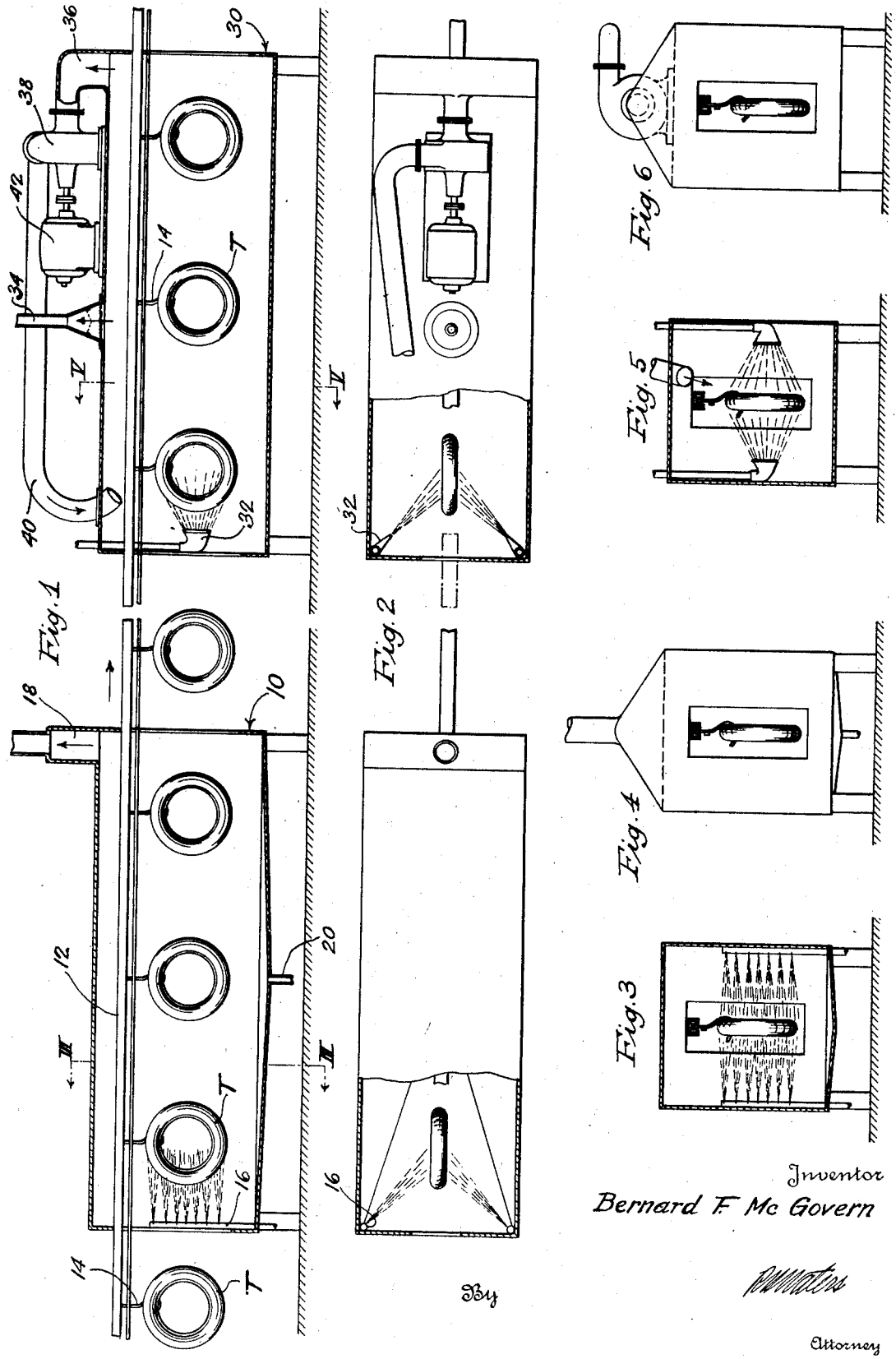
Inventor
Bernard F. McGovern
By
Attorney Patented Nov. 14, 1944

2,362,653

UNITED STATES PATENT OFFICE 2,362,653

METHOD AND APPARATUS FOR TREATING RUBBER ARTICLES PRIOR TO VULCANIZATION

Bernard F. McGovern, Akron, Ohio, assignor to Wingfoot Corporation, Akron, Ohio, a corporation of Delaware Application October 29, 1942, Serial No. 463,748

7 Claims. (Cl. 18—2)

This invention relates to methods and apparatus for treating rubber articles prior to vulcanization, and, more particularly, is concerned with improved means and methods for depositing a fine film of powdered lubricant of uniform thickness upon a pneumatic tire prior to the air-bagging operation and the vulcanization of the tire.

It is the general object of my invention to provide improved methods and apparatus for rapidly and inexpensively depositing a thin uniform coating of lubricant on rubber articles, such as rubber tires, prior to vulcanizing the articles in a metal mold.

Another object of my invention is the provision of an improved method for treating rubber tires, and the like, prior to vulcanizing the same, and including the steps of depositing a fine film of water on the rubber article followed by a dusting of a dry lubricant thereover to uniformly coat the article with the lubricant.

Another object of my invention is to provide apparatus for automatically treating rubber articles, such as pneumatic tires, to uniformly condense a fine film of water thereover followed by a dusting of the article with a dry lubricant whereby the insertion and removal, and/or vice-versa, of the article and the means for molding the rubber article is facilitated.

Another object of my invention is the provision of methods and apparatus for treating a rubber article with steam for a short period to facilitate the uniform coating of the article with a dry lubricant.

The foregoing and other objects of my invention are achieved by the provision of a method of treating an unvulcanized rubber tire, or the like, and including the steps of subjecting the surface of the tire to the direct action of steam to slightly bloom the surface thereof and to deposit thereon a thin uniform coating of moisture, and then dusting a uniform coating of dry lubricating material over the entire surface of the tire.

The apparatus of my invention includes a chamber, means for conveying the tires in turn through the chamber, means for directing steam against the tires when in the chamber, a second chamber, said conveying means extending through and carrying the tires through the second chamber, and means for blowing powdered lubricant against the tires in their passage through the second chamber.

For a better understanding of my invention reference should be had to the accompanying drawing wherein Figure 1 is a longitudinal vertical cross-sectional view through a typical apparatus embodiment of my invention; Figure 2 is a plan view, partly broken away, of the apparatus illustrated in Figure 1; Figure 3 is a transverse vertical cross-sectional view taken on line III—III of Figure 1; Figure 4 is an end elevation of the chamber shown at the left hand side of Figure 1; Figure 5 is a transverse vertical cross-sectional view taken on line V—V of Figure 1; and Figure 6 is an end elevation of the chamber shown at the right hand side of the apparatus of Figure 1.

Having particular reference to the apparatus embodiment illustrated in the drawing, the numeral 10 indicates generally a chamber which may obviously take a plurality of forms, but which conveniently comprises a body portion having a substantially square shape in transverse section and a length several times greater than its width. Extending through the chamber 10 are conveyor means 12 adapted to continuously transport a plurality of pneumatic tires T through the chamber, with the ends of the chamber being appropriately cut away, as best seen in Figure 4, so that the tires T can be conducted into and out of the chamber. The tires T are ordinarily supported on the conveyor 12 by hooks 14 in the manner often employed in the tire industry to transport tires.

As the tires T are transported through the chamber 10 they are subjected to the action of steam. This is usually achieved by the provision of a plurality of jets 16 which may be positioned adjacent the entering end of the chamber 10 and directed toward the exit end of the chamber. The jets 16 are of any necessary number, location and size so that each tire in passing through the chamber 10 will be subjected over its entire surface to a substantially uniform action by the steam. The steam serves not only to soften and render somewhat sticky the entire surface of the tire T, by giving the tire a slight bloom, but primarily functions to deposit on the tire a fine film of water or moisture uniformly of the complete tire surface. The formation of the film of moisture on the tire surface is due to the fact that when the tire passes into the chamber 10 it is substantially at room temperature and the steam condenses on the relatively cold surface of the tire substantially uniformly over the entire surface thereof.

The surplus steam from the jets 16 is removed from the chamber 10 adjacent the exit end of the chamber, as by the provision of an exit flue or exhaust conduit 18 which may be connected to a suitable exhaust fan or pump. The bottom of the chamber 10 may incline from opposite ends to a central discharge pipe 20 so that any steam condensation will drain out of the conduit 20.

Closely associated with the chamber 10 is a second chamber 30 of similar construction, and through which the conveyor 12 extends so that the tires T passing continuously through the chamber 10 are immediately conducted through the chamber 30. In the chamber 30 the tires T are subjected to a dusting action by a finely powdered dry lubricant, such as soapstone, mica or the like.

Conveniently, the lubricant or powder is blown against the tires T by jets 32 positioned adjacent the entering end of the chamber 30 and directed toward the discharge end of the chamber. The jets 32 may be of any number, location and size so as to subject every portion of the entire surface of the tire to the dusting action of the powdered lubricant. An exhaust conduit 34 may be provided to allow the escape of air from within the chamber 30. Also, separate means for circulating the powdered lubricant and air within the chamber 30 may be provided. These extra circulating means have been illustrated as comprising a pick-up conduit 36 extending to a blower 38 and with the blower 38 being connected to a conduit 40 which returns to the chamber 30 adjacent the entering end of the chamber. A motor 42 serves to drive the blower 38.

In the operation of the apparatus embodiment just described, the unvulcanized tires T, before or after shaping, are continuously passed on the conveyor 12 to and through the chamber 10 and then through the chamber 30. In the chamber 10 the tires have a thin coating of water applied thereto uniformly over their entire outer surface, and the immediate subsequent passage of the tires to and through the chamber 30, with the powdered lubricant being dusted over and around the tires in the chamber 30, causes the uniform deposit over the entire surface of each tire of a fine coating of powdered lubricant. Of course, the temperature of the steam employed in the chamber 10 renders the surface of the tires soft and tacky, which condition is termed a "bloom," and which aids in the deposition of the lubricant thereon. The provision of the steam jets 16 at the entering side of the chamber 10 and the positioning of the exhaust conduit 18 at the exit side of the chamber 10 serves to prevent the escape of steam from the chamber 10 through the openings at the ends of the chamber. In a similar manner, positioning the jets 32 at the entering end of the chamber 30 and positioning the exhaust conduit 36 at the exit end of the chamber 30 largely prevents any of the powdered lubricant from escaping from the chamber 30.

The improved method of my invention will be apparent from the foregoing description of a particular apparatus embodiment thereof. The method can be performed either by hand or with the assistance of apparatus, and broadly comprises depositing a fine film of water over the entire outer surface of an unvulcanized rubber article followed by a dusting of powdered lubricant over and around the article with a uniform coating of the lubricant adhering to the coating of water on the article. Preferably, the water is deposited on the rubber article to be treated by employing steam which blooms the surface of the article to render it soft and tacky to still further facilitate the uniform deposit of dry lubricant on the surface of the rubber article.

From the foregoing it will be recognized that the various objects of my invention have been achieved by the provision of improved methods and apparatus for depositing a powdered lubricant uniformly over the surface of an unvulcanized rubber article, and with the lubricant thereafter serving to facilitate the introduction and removal of an airbag normally employed in the inside of the pneumatic tire during the vulcanization thereof. The apparatus of my invention is quite inexpensive to construct and will operate over long periods with substantially no operator attention or repairs. The improved method of my invention can be readily practiced in conjunction with the manufacture of pneumatic tires, or other rubber articles, and overcomes and avoids substantially all of the objections which may be raised against previous methods for applying powdered lubricant to a rubber article.

While in accordance with the patent statutes I have particularly illustrated and described my advance in the art, it is to be particularly understood that I am not to be limited thereto or thereby, but that the scope of my invention is defined in the appended claims.

What I claim is:

1. That method of treating an unvulcanized rubber pneumatic tire to facilitate airbag insertion and removal and to facilitate removal of the tire from the vulcanizing mold which includes the steps of treating the surface of the unvulcanized tire directly with steam to bloom the surface of the tire and to deposit thereon a thin uniform coating of moisture, and dusting a uniform coating of dry lubricating material over the entire surface of the tire.

2. The method of treating a rubber tire prior to vulcanization which includes the steps of steaming the tire to deposit a fine film of moisture thereon, and blowing air and a finely divided powder over the tire to deposit a fine film of lubricant uniformly thereon.

3. That method of vulcanizing a rubber tire which includes the steps of treating the unvulcanized tire to condense a fine film of water uniformly thereon, dusting a powdered lubricant over and around the tire so that a uniform coating of lubricant will adhere to the water on the tire, and vulcanizing the tire.

4. The method of treating an unvulcanized rubber article which includes the steps of subjecting the rubber article to the direct action of live steam until a film of water is condensed thereon and dusting a powdered lubricant over the article to adhere the lubricant to the film of water thereon, whereby the molding operation on the article is facilitated.

5. Apparatus for treating unvulcanized rubber articles and including a chamber, means for conveying the articles in turn through the chamber, means for directing steam against the articles when in the chamber, a second chamber, said conveying means extending through and carrying the articles through the second chamber, and means for blowing powdered lubricant against the articles in their passage through the second chamber.

6. Apparatus for treating rubber articles prior to vulcanization including means for depositing a fine film of water uniformly over the entire surface of the articles, and means for dusting a powder over and around the articles so that the powder will adhere to the water on the article.

7. Apparatus for treating rubber articles prior to vulcanization including means for continuously conveying the articles, means for continuously and progressively heating and rendering soft and tacky the surface of the articles, and means for continuously and progressively depositing a coating of powder on the surface of the articles.

BERNARD F. McGOVERN.